United States Patent [19]

Yamashita et al.

[11] 4,349,525
[45] Sep. 14, 1982

[54] PROCESS FOR PURIFYING HYDROCHLORIC ACID PRODUCED FROM ALKALI CHLORIDE AND SULFURIC ACID

[75] Inventors: Yoshisato Yamashita; Yutaka Matsuo, both of Minamatashi, Japan

[73] Assignee: Chisso Corporation, Osaka, Japan

[21] Appl. No.: 256,241

[22] Filed: Apr. 21, 1981

[51] Int. Cl.³ ............................................. C01B 7/07
[52] U.S. Cl. .................................. 423/488; 423/482
[58] Field of Search ................. 423/481, 482, 488; 203/96

[56] References Cited

U.S. PATENT DOCUMENTS 2,165,784  7/1939  Burrage ................................. 423/488
2,220,570  11/1940  Hurt ..................................... 423/482

FOREIGN PATENT DOCUMENTS 1009036  11/1965  United Kingdom ............... 423/488
 538982   1/1977  U.S.S.R. ........................... 423/488

Primary Examiner—Earl C. Thomas
Attorney, Agent, or Firm—Wenderot, Lind & Ponack

[57] ABSTRACT

Hydrochloric acid produced by reacting an alkali chloride with sulfuric acid to prepare hydrogen chloride gas, followed by having the gas absorbed in water, contains a slightest amount of $Br_2$ and other coloring materials as volatile impurities, but such amounts of impurities can be removed according to a purifying process in which the resulting hydrochloric acid is treated with an inert gas or a mixture of an inert gas with oxygen.

5 Claims, 1 Drawing Figure

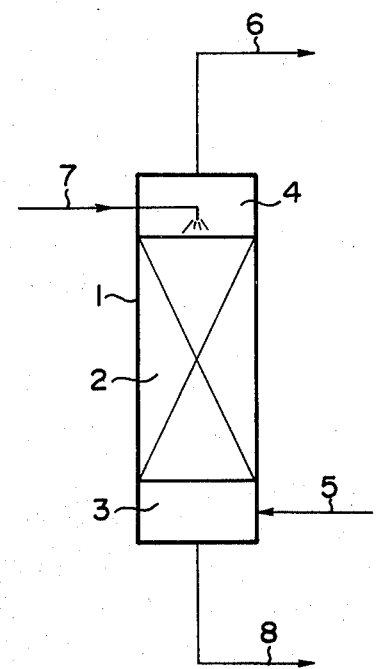

1

PROCESS FOR PURIFYING HYDROCHLORIC ACID PRODUCED FROM ALKALI CHLORIDE AND SULFURIC ACID

BACKGROUND OF THE INVENTION

1. Field of the Invention

This invention relates to a process for purifying hydrochloric acid produced from an alkali chloride and sulfuric acid. More particularly, it relates to a process for purifying hydrochloric acid produced from an alkali chloride and sulfuric acid, by treating it with an inert gas or a mixed gas of an inert gas with oxygen to remove volatile impurities included therein.

2. Description of the Prior Art

A process in which hydrogen chloride is generated by reacting an alkali chloride with sulfuric acid and caused to be absorbed in water to provide hydrochloric acid (this process will hereinafter be referred to as conversion process), does not consume a large amount of electric power and, unlike an alkali chloride-electrolysis process, hydrogen chloride, not chlorine, can be directly obtained and a useful alkali sulfate can be simultaneously obtained. Thus, in this regard, this process is one of the techniques which might be looked over again at the present time to meet the demand of energy saving.

However, the hydrochloric acid produced according to the conversion process contains $Br_2$ and other coloring materials, as volatile impurities formed by the reaction of an alkali chloride with sulfuric acid, and in order to remove effectively such volatile impure coloring materials (which will be hereinafter referred to as volatile impurities, etc.), such a treatment as rectification has been necessary to obtain hydrochloric acid useful for chemical industries.

In view of the above-mentioned status of hydrochloric acid produced according to the conversion process (which will hereinafter be referred to as conversion process-hydrochloric acid), we have been studying a process for removing the slightest amounts of volatile impurities, etc. which are formed by the conversion reaction and which are included in the conversion process-hydrochloric acid to thereby purify the acid. As a result of our earnest study, it has been found that such removal and purification can be effected at a single stroke without necessity of rectification, by treating the conversion process-hydrochloric acid with an inert gas or a mixed gas of oxygen with an inert gas. When a mixed gas of oxygen with an inert gas is used, if $Br_2$ and other coloring materials are oxidized in the liquid, it is anticipated that coloring materials such as bromic acid and other coloring materials which are hardly distillable, form in the conversion process-hydrochloric acid and remain as impurities. By such a way of thinking the present invention is considered to relate to an unpredictably useful technique.

As evident from the foregoing description, an object of the present invention is to provide a process for purifying a conversion process-hydrochloric acid which does not require any special purifying step such as rectification (though it is doubtful whether or not $Br_2$ and the like can be removed sufficiently by rectification). Another object of the present invention is to provide a conversion process-hydrochloric acid purified according to the above-mentioned process.

SUMMARY OF THE INVENTION

1. The present invention resides in a process for purifying a conversion process-hydrochloric acid which is characterized by causing the hydrogen chloride gas generated by reacting an alkali chloride with sulfuric acid, to be absorbed in water and treating the resulting hydrochloric acid with an inert gas or a mixed gas of oxygen with an inert gas.

2. As one embodiment, the present invention resides in the above-mentioned process 1 wherein said alkali chloride is sodium or potassium chloride.

3. As another embodiment, the present invention resides in the above-mentioned process 1 to 2 wherein said mixed gas of oxygen with an inert gas is a mixed gas of oxygen with nitrogen (including air).

4. As a further embodiment, the present invention resides in any one of the above-mentioned processes (1) to (3) wherein the conversion process-hydrochloric acid to be purified contains 10 to 200 ppm of $SO_2$ and 0.05 to 5 ppm bromine.

5. As a further embodiment, the present invention resides in any one of the above-mentioned processes (1) to (3) wherein the temperature of the conversion process-hydrochloric acid at the time of treatment with an inert gas or a mixed gas of oxygen with an inert gas is in the range of from room temperature to 50° C. and the temperature of the above-mentioned inert gas or mixed gas is in the range of 0° C. to 100° C.

More detailed description will be made as to the constitution and the effectiveness of the present invention.

a. The conversion process-hydrochloric acid used in the present invention is obtained by causing hydrogen chloride gas formed from the reaction between an alkali chloride e.g. potassium chloride and sulfuric acid, to be absorbed in water. The reaction can be carried out not only by the so-called dry process in which an alkali chloride is reacted in solid state with sulfuric acid, but also by the so-called wet process in which sulfuric acid is reacted with an aqueous solution of an alkali chloride. However, in the case of the wet process, the formed hydrogen chloride remains dissolved in an aqueous solution of an alkali chloride, and separation of hydrogen chloride gas separately by way of distillation or the like is necessary; hence a necessary preliminary step is added.

In the case of conversion process-hydrogen chloride gas, a conversion process-hydrochloric acid is obtained by causing it to be absorbed in water according to a conventional process, but it is difficult to effect elimination of volatile impurities which is the object of the present invention, by a treatment before the absorption. On the other hand, as for dust such as a slight amount of an alkali sulfate, iron matter, etc. and mist of sulfuric acid, etc, which are impurities other than volatile impurities in the conversion process-hydrogen chloride gas, there is a possibility that they can be removed before the conversion process-hydrogen chloride gas is caused to be absorbed in water, but they are outside the object of the present invention. Even if the conversion process-hydrochloric acid contains such dust, mist, etc., they are not harmful to the practice of the process of the present invention. As for the impurities in the conversion process-hydrochloric acid, principal materials of the volatile impurities, etc. to be treated according to the process of the present invention, include the above-mentioned $Br_2$ and coloring materials whose chemical structures are unknown. $Br_2$ among them is considered to be formed as follows: a slight amount of an alkali bromide contained in one of the raw materials for the conversion, i.e. an alkali chloride, reacts with sulfuric acid to produce HBr which is oxidized by air or $SO_3$ in the conversion process-hydrogen chloride gas to form $Br_2$. On the other hand, $SO_2$ is considered to be formed as follows: sulfuric acid as one of the conversion raw materials is dehydrated into $SO_3$, which is then reduced be reducing impurities or dissociate into $SO_2$ and $O_2$ by an equilibrium reaction to form $SO_2$. The $SO_2$ itself is not a coloring material, but since purification effect i.e. decolorizing effect of the present invention is increased by its removal, it is considered that the $SO_2$ is related to coloring materials whose chemical structures have not been known. The concentrations of these volatile impurities in the conversion process-hydrochloric acid is 0.05 to 2 ppm in case of $Br_2$ and 10 to 500 ppm in case of $SO_2$. As for the coloring extent of the impurities, pale yellow to deep yellow (but transparent) is exhibited in the case of a conversion process-hydrochloric acid having a concentration of 33 to 36% by weight.

b. As for the inert gas or mixed gas of oxygen with an inert gas, a nitrogen gas obtained by subjecting air to low-temperature processing, and having a purity of 90% by volume or higher, will be sufficient for the former, and a mixture of an inert gas such as nitrogen, argon, carbon dioxide, etc. with oxygen in such a volume ratio as 0.1 to 10:1 is useful for the latter. Besides, air cleaned by eliminating dust, etc. is also useful for the latter, but in case where carbon dioxide is used, decarbonation may be necessary after the treatment.

c. Now the conditions for treating the conversion process-hydrochloric acid with an inert gas or a mixed gas of oxygen with an inert gas (which will hereinafter be referred to as "inert gas, etc.") will be described.

The treatment of the conversion process-hydrochloric acid with inert gas, etc. will be carried out successfully if sufficient contact of both the materials is effected at an appropriate temperature and under an appropriate pressure for an appropriate treatment time, and there is no particular limitation as to the treatment conditions and contacting method. This applies to the HCl concentration and temperature of the conversion process-hydrochloric acid. A conversion process-hydrochloric acid having a concentration of 20 to 35% by weight, preferably 28 to 35% by weight is maintained at a temperature of room temperature to 50° and treated for 5 minutes to one hour (in case of batch process) or 0.1 second to 30 seconds, preferably 3 seconds to 15 seconds (in case of continuous circulation process).

The concentration, temperature and pressure of the inert gas, etc., also have no particular limitation, but a concentration of 10 to 90% by volume, a temperature of room temperature to 100° C. and a pressure of atmospheric pressure to 1 $kg/cm^2G$ are convenient to use. In the case of batch process as well as in the case of continuous process, there is no limitation as to kinds of apparatus or washing type, and either of parallel current or counter-current contact type or gas blowing-in liquid-type is useful. However, for the purpose of removing a trace of volatile impurities, etc. contained in a large amount of the conversion process-hydrochloric acid or oxidizing and decolorizing the same, a gas-liquid contact type (e.g. the use of a packed tower) which maximizes the contact area of gas-liquid and makes it possible to save power consumption is preferable. There is no limitation as to the amount ratio of gas-liquid (by volume) in this type, but a ratio of 10 to $10^4$ preferably $10^2$ to $10^3$ parts of inert gas, etc. per 1 part of conversion process-hydrochloric acid is useful.

d. The effectiveness attained by the treatment with an inert gas, etc. will be described.

The $Br_2$ concentration in the conversion process-hydrochloric acid treated according to the process of the present invention will be reduced from 0.05 to 2 ppm before the treatment down to 0.00 to 0.01 ppm after the treatment, and $SO_2$ concentration in the same will be reduced from 10 to 500 ppm before the treatment down to 0.5 to 5 ppm after the treatment. Coloration will be reduced from pale yellow to deep yellow color before the treatment down to water-whiteness after the treatment.

As mentioned above, according to the process of the present invention, the removal or decolorization of $Br_2$, other coloring materials and $SO_2$ becomes possible without using any special apparatus and chemical treatment and without needing any rectification; hence the process of the present invention is suitable to purify the conversion process-hydrochloric acid up to an extent of hydrochloric acid useful as a raw material for the chemical industry.

Further, the exhaust gas formed in the treatment with an inert gas, etc. can be converted easily to a harmless state by washing with water, dilute aqueous solution of sodium carbonate, etc. and does not exceed environmental criteria.

The process of the present invention will be illustrated more fully referring to the accompanying drawing and specific examples.

The drawing shows a schematic view of an apparatus for purifying the conversion process-hydrochloric acid used in the present invention.

In the drawing, numeral 1 means a packed tower, 2 means a packed section, 3 means an inert gas, etc.—introducing chamber, 4 means a conversion process-hydrochloric acid-spraying chamber, 5 means an inert gas, etc.—introducing pipe, 6 means an inert gas, etc.—discharging pipe, 7 means a pipe for introducing the conversion process-hydrochloric acid, and 8 means a withdrawal pipe of the conversion process-hydrochloric acid.

EXAMPLE 1

A conversion process-hydrochloric acid is sprayed through a pipe for introducing the acid 7 into a spraying chamber of a conversion process-hydrochloric acid 4 of a packed tower 1 having 300 mm diameter and 3 m height in the packed section 2. The sprayed hydrochloric acid diffuses almost uniformly inside the packed section 2 and flows down therethrough and is discharged through the inert gas, etc.—introducing chamber 3 and the withdrawal pipe of the conversion process-hydrochloric acid 8. Meanwhile, an inert gas, etc. is introduced through the inert gas, etc.—introducing pipe 5 into the introducing chamber 3. The inert gas, etc. ascends through the inside of the tower, sufficiently contacts the conversion process-hydrochloric acid flowing down in the packed section 2, while removing the impurities contained in the hydrochloric acid, i.e. $Br_2$, $SO_2$, from the acid and simultaneously decolorizing coloring materials. The inert gas, etc. having ascended through the packed section 2 passes through the spraying chamber 4 and is discharged from the inert gas, etc.—discharging pipe 6. The treating conditions are as follows: the conversion process-hydrochloric acid is fed at a HCl concentration of 30.1% by weight, at a temperature of 25° C. and at a rate of 35 kg/hr, and the hydrochloric acid discharged after the treatment has a concentration of 29.3% by weight and a temperature of 23.5° C. As the inert gas, etc. 35 Nm³/hr of air at a temperature of 20° C. was fed, and 35.5 Nm³/hr of air at a temperature of 22° C. was discharged after used. The results of purification are shown in the following Table 1.

TABLE 1

| Results of treatment with air (1st) | Before treatment | After treatment |
|---|---|---|
| HCl Content % by weight | 30.1 | 29.3 |
| Color | pale yellow | colorless |
| Fe ppm | 0.02 | 0.02 |
| $SO_2$ ppm | 89 | 3 |
| $Br_2$ ppm | 0.2 | 0.0 |

Note:
Each content is a value based upon a hydrochloric acid of 35% by weight hydrogen chloride.

EXAMPLE 2

An operation was carried out as in Example 1 except that a conversion process-hydrochloric acid having a HCl content of 35.2% by weight was used at a rate of 35 kg/hr, and air was used at a rate of 25 Nm³/hr. Purified hydrochloric acid containing 31.8% by weight of HCl was produced with a yield of 33.3 kg/hr and the loss of HCl was 14%.

The results of purification are shown in the following Table 2.

TABLE 2

| Results of treatment with air (2nd) | Before treatment | After treatment |
|---|---|---|
| HCl content % by weight | 35.2 | 31.8 |
| Color | yellow | colorless |

TABLE 2-continued

| Results of treatment with air (2nd) | Before treatment | After treatment |
|---|---|---|
| Fe ppm | 0.02 | 0.02 |
| $SO_2$ ppm | 85 | 5 |
| $Br_2$ ppm | 0.2 | 0.0 |

Note:
Each content is a value based upon a hydrochloric acid of 35% by weight hydrogen chloride.

As evident from the results of Examples 1 and 2, a certain amount of HCl in the conversion process-hydrochloric acid is lost and iron matter is not removed by the treatment with a large amount of air, but colored product turns colorless, the content of $SO_2$ is notably reduced down to 5 ppm or lower and $BR_2$ is removed almost completely.

It is evident that such a treatment of the process of the present invention, enables ones to remove volatile impurities such as $SO_2$, $Br_2$ or the like at an extremely low cost almost without spending power or energy except the one used for blowers.

What is claimed is:

1. A process for purifying a conversion process-hydrochloric acid which comprises treating hydrochloric acid having a concentration of 20 to 35% by weight and obtained by causing hydrogen chloride gas generated by reacting an alkali chloride with sulfuric acid to be absorbed in water with an inert gas or a mixed gas of inert gas with oxygen to remove $SO_2$ and $Br_2$ contained in the said hydrochloric acid.

2. A process according to claim 1 wherein said alkali chloride is sodium or potassium chloride.

3. A process according to claim 1 wherein said mixed gas of oxygen with an inert gas is air.

4. A process according to claim 1 wherein said conversion process-hydrochloric acid to be purified contains 10 to 200 ppm of $SO_2$ and 0.05 to 5 ppm of $Br_2$.

5. A process according to claim 1 wherein the temperature of the conversion process-hydrochloric acid at the time of treatment with an inert gas or a mixed gas of oxygen with an inert gas is in the range of from room temperature to 50° C. and the temperature of the inert gas or mixed gas is in the range of from 0° C. to 100° C.

* * * * *